United States Patent [19]

Yamane et al.

[11] 4,079,703

[45] Mar. 21, 1978

[54] INTERNAL COMBUSTION ENGINE OPERATED ON INJECTED FUEL SUPPLEMENTED WITH HYDROGEN

[75] Inventors: Kimitaka Yamane, Sayama; Akira Morita, Tokyo; Zene Ueno, Fuchu, all of Japan

[73] Assignee: Nissan Motor Company, Ltd., Japan

[21] Appl. No.: 641,759

[22] Filed: Dec. 17, 1975

[30] Foreign Application Priority Data

Dec. 18, 1974 Japan .................................. 49-145190

[51] Int. Cl.² ............................................... F02B 43/08
[52] U.S. Cl. .................................. 123/3; 123/32 SP; 123/DIG. 12
[58] Field of Search .................. 123/3, 1 A, DIG. 12, 123/32 ST, 32 SP, 32 SA

[56] References Cited

U.S. PATENT DOCUMENTS

| | | | |
|---|---|---|---|
| 2,882,873 | 4/1959 | Witzky | 123/32 ST |
| 3,015,326 | 1/1962 | Wirsching et al. | 123/140 CC |
| 3,195,520 | 7/1965 | Simko | 123/32 ST |
| 3,336,912 | 8/1967 | Morris | 123/140 CC |
| 3,696,795 | 10/1972 | Smith et al. | 123/DIG. 12 |
| 3,717,129 | 2/1973 | Fox | 123/3 |
| 3,855,980 | 12/1974 | Weisz et al. | 123/3 |
| 3,939,806 | 2/1976 | Bradley | 123/3 |
| 3,948,224 | 4/1976 | Knapp et al. | 123/3 |
| 3,968,775 | 7/1976 | Harpman | 123/3 |
| 3,970,054 | 7/1976 | Henault et al. | 123/DIG. 12 |

*Primary Examiner*—Charles J. Myhre
*Assistant Examiner*—David D. Reynolds

[57] ABSTRACT

A lean mixture, rich in hydrogen, is introduced into the combustion chamber. Fuel is then injected to the center of the chamber to provide a rich strata. The rapid flame front propagation due to the hydrogen minimizes the HC production quench.

12 Claims, 3 Drawing Figures

INTERNAL COMBUSTION ENGINE OPERATED ON INJECTED FUEL SUPPLEMENTED WITH HYDROGEN

This invention relates to an internal combustion engine operated on an air-fuel mixture supplemented with hydrogen gas.

It is an object of the present invention to provide an improved internal combustion engine which enables stable operation of the engine with lower emission level of noxious gases.

Another object of the present invention is to provide an improved spark ignition internal combustion engine by which combustion chambers are firstly supplied with a mixture of hydrogen gas and air and thereafter liquid fuel is injected to the generally central portion of each combustion chamber, whereby the air-fuel mixture within the combustion chamber is stratified to effectively be burned to lower the emission levels of carbon monoxide and unburned hydrocarbons.

Other objects and features of the improved internal combustion engine in accordance with the principle of the present invention will become more apparent from the following description taken in conjunction with the accompanying drawings in which.

Figure 1:
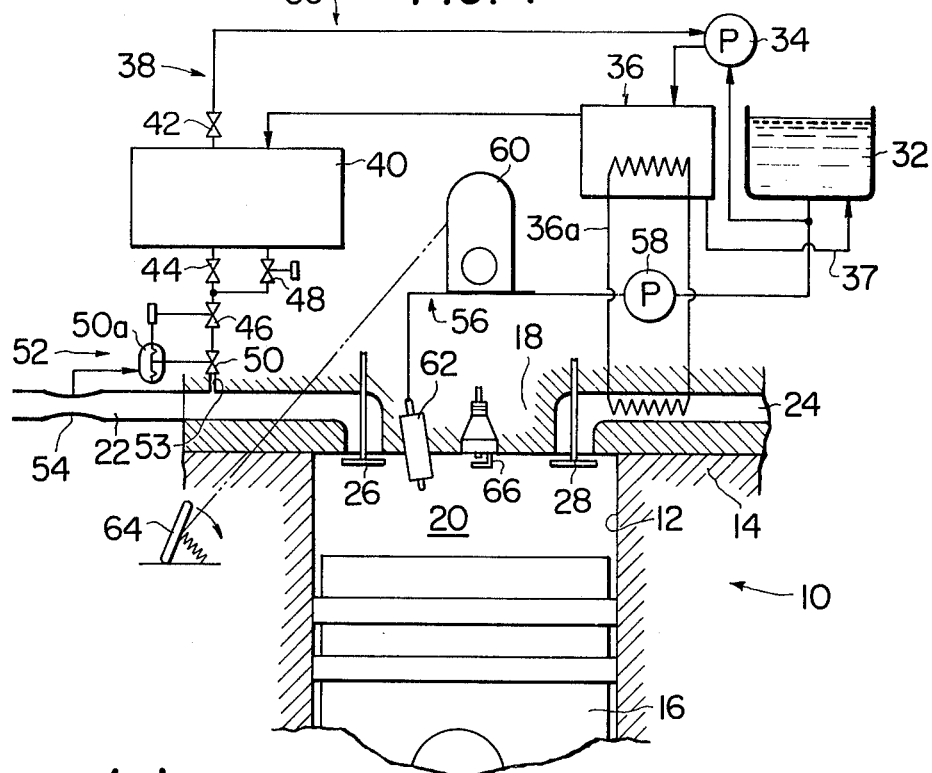
FIG. 1 is a schematical representation of a preferred embodiment of an internal combustion engine in accordance with the principle of the present invention.

Referring now to FIG. 1, there is shown a preferred embodiment in accordance with the principle of the present invention in which a spark-ignition internal combustion engine of the four-cycle valve-in-head type is designated by reference numeral 10. The engine 10 is a multi-cylinder internal combustion engine, only one cylinder 12 of which is shown in the vertical transverse section. The cylinder 12 is formed in the body casting portion of the cylinder block 14. A piston 16 is reciprocally disposed in the cylinder 12 and is operatively connected by a connecting rod to a crank arm of a crankshaft (they are not shown).

Covering the upper portion of the cylinder 12 is a cylinder head structure 18 which is secured to the body casting portion of the cylinder block 14 by bolts (not shown). The cylinder head 18 cooperates with the upper portion of the piston 16 to form a combustion chamber 20 therebetween. The cylinder head 18 is formed with an air-intake passage 22 and an exhaust passage 24 which are connected to the combustion chambr 20 through an intake valve 26 and an exhaust valve 28, respectively. The air-intake passage 22 is arranged to supply atmospheric air therethrough to the combustion chamber 20.

As seen, the internal combustion engine 10 is equipped with a hydrogen gas supply means 30 which comprises a fuel tank 32 containing liquid fuel therein or a fuel source. The fuel tank 32 is connected to a fuel pump 34 for admitting the fuel from the fuel tank 32 into a fuel reforming device 36 which forms part of hydrogen gas source 38. The reforming device 36 is arranged to generate reformed gas containing hydrogen gas by endothermic reforming reaction. The reforming device 36 is equipped with a heater 36a or a heat exchanger for supplying the heat for the endothermic reforming reaction carried out in the reforming device 36. The heat 36a is arranged to be supplied with the heat of the exhaust gases emitted from the combustion chamber 20. A pipe 37 connecting the reforming device 36 and the fuel tank 32 functions to return the liquid fuel still not reformed to the fuel tank 32. The reforming device 36 is connected to a reformed gas accumulator 40 for accumulating the reformed gas admitted from the reforming device. The accumulator 40 has a pressure responsive switch 42 which is arranged to stop the function of the fuel pump 34 when the pressure within the accumulator 40 exceeds a predetermined level. The accumulator 40 is connected through a check valve 44 to a normally open valve 46 which is arranged to be closed when the engine 10 is stopped. The accumulator 40 is further connected to an upstream portion of the valve 46 through a normally closed valve 48 which is arranged to open for allowing the reformed gas to flow during engine starting. The valve 46 is connected to a diaphragm actuating valve 50 which forms part of regulating means 52. The valve 50 is connected to a nozzle 53 or a hydrogen gas supply nozzle which opens into the air-intake passage 22 in order to supply the reformed gas to the stream of air flowing through the air-intake passage 22. The diaphragm assembly 50a of the valve 50 is communicated with a venturi portion 54 of the air-intake passage 22 and therefore the valve 50 is arranged to regulate the amount of the reformed gas supplied through the nozzle 53 in response to the vacuum generated at the venturi portion 54, in other words, the air amount supplied to the combustion chamber 20 through the air-intake passage 22.

The internal combustion engine 10 is equipped with fuel injecting means 56 comprising the fuel tank 32 containing the liquid fuel. The fuel tank 32 is connected to a fuel pump 58 which is in turn connected to a variable plunger pump 60. The variable plunger pump 60 is arranged to supply the combustion chamber 20 with variable amounts of the liquid fuel through a fuel injector 62 in response to the movement of the accelerator 64. The fuel injector 62 is disposed through the generally central portion of the cylinder head 18 and extends into the combustion chamber 20. The injector 62 is oriented generally toward the central portion of the combustion chamber 20 to inject the liquid fuel admitted from the plunger pump 60 toward same. Disposed adjacent to the fuel injector 62 and through the generally central portion of the cylinder head 18 is a spark plug 66 or an igniter which functions to ignite a relatively rich air-fuel mixture formed at the central portion of the combustion chamber 20 by mixing the liquid fuel sprayed from the injector 62 with the air inducted through the air-intake passage 22.

With the arrangement mentioned hereinbefore, when the engine 10 is started, the reformed gas containing hydrogen gas within the accumulator 40 is supplied from the nozzle 52 into the air-intake passage 22 through the valves 46, 48 and 50. Then, the supplied reformed gas is mixed with the air passing through the air-intake passage 22, in which the mixed gas is set at a lean air-fuel (reformed gas) mixture. After engine starting or during normal engine operation, the heat exchanger 36a works receiving heat from the exhaust gases to operate the fuel reforming device 36. The reforming device 36 then generates the reformed gas and the reformed gas is admitted to the accumulator 40. The reformed gas is thereafter supplied through the valves 44, 46 and 50 from the nozzle 52 into the air-intake passage 22 to mix with the air passing through the air-intake passage 22.

Figure 2:
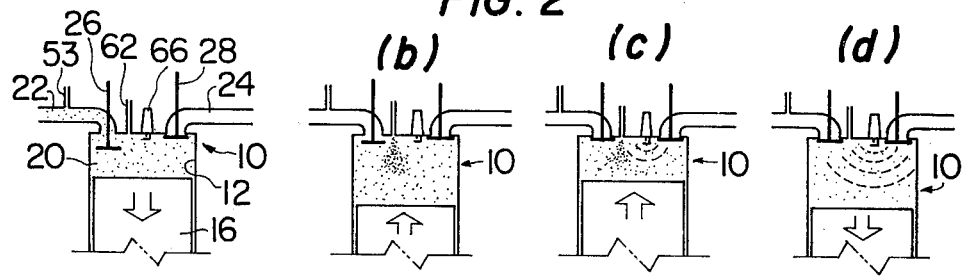
FIG. 2 is schematical representation showing a manner of operating the engine of FIG. 1.

FIG. 2 illustrates a manner of operation of the engine 10 constructed in accordance with the present invention, at position (a) of which the mixed gas of reformed gas and air in the air-intake passage 22 is thereafter sucked and supplied through the intake valve 26 into the combustion chamber 20 by descent of the piston 16 or during suction or induction stroke of the engine 10. At position (b), the liquid fuel is injected or sprayed from the injector 62 to the generally central portion of the combustion chamber 20 during the compression stroke. In this state, the relatively rich air-fuel mixture containing hydrogen gas is formed at the generally central portion of the combustion chamber 20 and a layer of relatively lean air-fuel mixture containing hydrogen gas is formed around the rich air-fuel mixture. At position (c), the mixture compressed by the piston 16 is then ignited by the spark plug 66, in which the spark plug 66 ignites the rich air-fuel mixture at the central portion of the combustion chamber 20 to secure the ignition of the entire air-fuel mixture. At position (d), combustion spreads to the layer of lean air-fuel mixture surrounding the rich air-fuel mixture and then the gas within the combustion chamber expands to cause the piston to descend. It should be noted that the layer of the mixed gas containing hydrogen gas is adjacent the inner wall of the combustion chamber 20 and accordingly the layer is effectively combusted through the layer is of the lean air-fuel mixture. This prevents imperfect combustion of the lean mixture adjacent the inner wall surface of the combustion chamber due to the low calorific value of the lean mixture and release or absorption of heat generated by the combustion through the wall of the combustion chamber. Therefore formation of the mixture layer containing hydrogen gas at the portion adjacent the inner wall of the combustion chamber noticeably contributes to lowering emission levels of carbon monoxide and unburned hydrocarbons.

Figure 3:
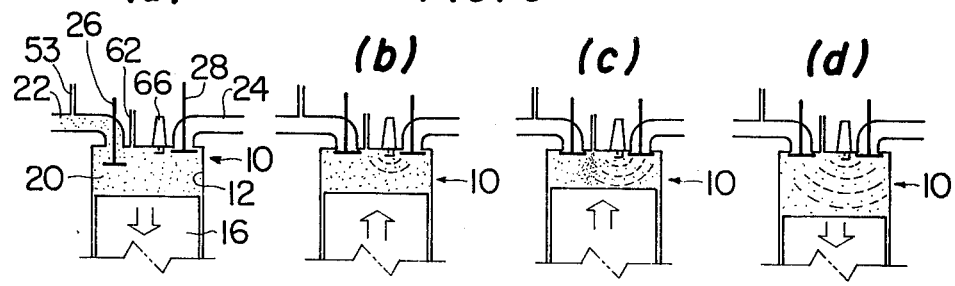
FIG. 3 is schematical representation similar to FIG. 2, but shows another manner of operating the engine of FIG. 1.

FIG. 3 illustrates another manner of operation of the engine 10 which is similar to that of FIG. 2 with the exception that the liquid fuel is injected from the fuel injector 62 after the mixed gas of reformed gas and air is ignited by the spark plug 66. As shown at position (b), the mixed gas containing hydrogen gas is ignited at a timing before top dead center. The ignition timing is preferably about 10° before top dead center. At position (c), the liquid fuel is injected and sprayed into the combustion chamber 20 to be ignited with the flame produced by the combustion of the mixed gas.

While the fuel reforming device 36 and its accessories are shown and described as a hydrogen gas source, it will be seen that a cylinder containing hydrogen gas may be used for the same purpose.

It will be understood that the engine according to the present invention is, through not shown, equipped with means for setting the spark-ignition timing of the spark-plug 66 after the fuel injection timing of the injector 62 when operated in the manner shown in FIG. 2, whereas with means for setting the timing of the spark-plug 66 before the timing of the injector 62 when operated in the manner shown in FIG. 3.

As is apparent from the foregoing discussion, with the internal combustion engine in accordance with the present invention, the stratified charge of the air-fuel mixture is achieved and therefore ignition and combustion of the air-fuel mixture are effectively carried out even if the air-fuel mixture is as a whole over lean, and thermal efficiency of the engine is as a matter of course improved. In addition, since the air-fuel mixture adjacent the inner wall surface of the combustion chamber contains hydrogen gas, the air-fuel mixture is effectively burned to prevent the incomplete combustion and accordingly the emission levels of carbon monoxide and unburned hydrocarbons are lowered to a considerable extent.

What is claimed is:

1. A method of operating an internal combustion engine having a combustion chamber, comprising the steps in the following order of:
    supplying a mixture of air and hydrogen gas into the combustion chamber;
    igniting the mixture in the combustion chamber; and
    supplying a sprayed liquid fuel into the combustion chamber to be burned with the mixture.

2. A method as claimed in claim 1, in which the step of supplying a mixture includes a step of supplying the hydrogen gas into the stream of the air directed into the combustion chamber.

3. A method as claimed in claim 1, in which the step of supplying a sprayed fuel is included a step of injecting the fuel directly into the combustion chamber.

4. A method as claimed in claim 2, in which the step of supplying the hydrogen gas includes a step of regulating the supply amount of hydrogen gas in response to the air amount directed to the combustion chamber.

5. An internal combustion engine having a cylinder, a cylinder head and a piston reciprocally disposed in the cylinder to define a combustion chamber between the cylinder head, comprising:
    an air-intake passage fluidly connected to the combustion chamber to supply air therethrough to the combustion chamber;
    hydrogen gas supply means for supplying hydrogen gas into said air-intake passage in response to the amount of the air supplied to the combustion chamber, said hydrogen gas supply means including
    a hydrogen gas source, said hydrogen gas source including a fuel source containing a liquid fuel therein, a fuel pump connected to said fuel source, a fuel reforming device connected to said fuel pump and arranged to generate the reformed gas containing hydrogen gas, a reformed gas accumulator connected to said reforming device for accumulating the reformed gas admitted from the reforming device, a pressure responsive switch arranged to stop the function of said fuel pump when the pressure within the accumulator exceeds a predetermined level, a check valve connected to the accumulator, a normally open valve connected to said check valve and arranged to close for blocking the reformed gas to flow when the engine is stopped, and a normally closed valve connecting the accumulator and the upstream portion of said normally open valve, and arranged to open for allowing the reformed gas to flow during engine starting,
    regulating means connected to said hydrogen gas source for regulating the hydrogen gas flowing amount in response to the air amount supplied to the combustion chamber, and
    a hydrogen gas supply nozzle connected to said regulating means and opening into said air-intake passage;

fuel injecting means for injecting liquid fuel to the central portion of the combustion chamber to form a rich air-fuel mixture at the generally central portion of the combustion chamber; and an igniter disposed through the generally central portion of the cylinder head to ignite the rich air-fuel mixture at the generally central portion of the combustion chamber.

6. An internal combustion engine as claimed in claim 5, in which said regulating means includes a venturi portion formed at said air-intake passage, and a diaphragm actuating valve connected to said normally open valve and arranged to open for allowing the reformed gas to flow in response to the vacuum generated at said venturi portion, said diaphragm actuating valve being connected to said hydrogen gas supply nozzle.

7. An internal combustion engine as claimed in claim 5, in which said fuel reforming device is equipped with a heater for supplying the heat for endothermic reforming reaction carried out in the reforming device, said heater being arranged to be supplied with heat of the exhaust gas emitted from the combustion chamber.

8. An internal combustion engine as claimed in claim 5, in which said hydrogen gas source includes a cylinder containing hydrogen gas.

9. An internal combustion engine as claimed in claim 5, in which said fuel injecting means includes a fuel source containing a liquid fuel therein, a fuel pump connected to said fuel source, a fuel injector disposed through the generally central portion of the cylinder head, said fuel injector being oriented to the generally central portion of the combustion chamber, and a variable plunger pump connecting said fuel pump and said fuel injector and arranged to supply the combustion chamber with a variable amount of the liquid fuel through said fuel injector in response to the movement of an accelerator.

10. An internal combustion engine having a cylinder, a cylinder head and a piston reciprocally disposed in the cylinder to define a combustion chamber between the cylinder head, comprising:

an air-intake passage fluidly connected to the combustion chamber to supply air therethrough to the combustion chamber;

hydrogen gas supply means for supplying hydrogen gas into said air-intake passage in response to the amount of the air supplied to the combustion chamber, said hydrogen gas supply means including a hydrogen gas source, said hydrogen gas source including a fuel source containing a liquid fuel therein, a fuel pump connected to said fuel source, a fuel reforming device connected to said fuel pump and arranged to generate the reformed gas containing hydrogen gas, said fuel reforming device being equipped with a heater for supplying the heat for endothermic reforming reaction carried out in the reforming device, said heater being arranged to be supplied with heat of the exhaust gas emitted from the combustion chamber, a reformed gas accumulator connected to said reforming device for accumulating the reformed gas admitted from the reforming device, a pressure responsive switch arranged to stop the function of said fuel pump when the pressure within the accumulator exceeds a predetermined level, a check valve connected to the accumulator, a normally open valve connected to said check valve and arranged to close for blocking the reformed gas to flow when the engine is stopped, and a normally closed valve connecting the accumulator and the upstream portion of said normally open valve, and arranged to open for allowing the reformed gas to flow during engine starting, regulating means connected to said hydrogen gas source for regulating the hydrogen gas flowing amount in response to the air amount supplied to the combustion chamber, said regulating means including a venturi portion formed at said air-intake passage, and a diaphragm actuating valve connected to said normally open valve and arranged to open for allowing the reformed gas to flow in response to the vacuum generated at said venturi portion, said diaphragm actuating valve being connected to said hydrogen gas supply nozzle, and a hydrogen gas supply nozzle connected to said regulating means and opening into said air-intake passage;

fuel injecting means for injecting liquid fuel to the central portion of the combustion chamber to form a rich air-fuel mixture at the generally central portion of the combustion chamber, said fuel injecting means including a fuel source containing a liquid fuel therein, a fuel pump connected to said fuel source, a fuel injector disposed through the generally central portion of the cylinder head, said fuel injector being oriented to the generally central portion of the combustion chamber, and a variable plunger pump connecting said fuel pump and said fuel injector and arranged to supply the combustion chamber with a variable amount of the liquid fuel through said fuel injector in response to the movement of an accelerator; and an igniter disposed through the generally central portion of the cylinder head to ignite the rich air-fuel mixture at the generaly central portion of the combustion chamber.

11. An internal combustion engine as claimed in claim 10, in which further comprising means for setting the ignition timing of said igniter before the fuel injection timing of said fuel injecting means.

12. An internal combustion engine as claimed in claim 10, in which further comprising means for setting the ignition timing of said igniter after the fuel injection timing of said fuel injecting means.

* * * * *